United States Patent
Zhou et al.

(10) Patent No.: US 8,451,584 B2
(45) Date of Patent: May 28, 2013

(54) SOLID STATE ENERGY STORAGE DEVICE AND METHOD

(75) Inventors: Xiangyang Zhou, Miami, FL (US); Juanjuan Zhou, Miami, FL (US); Azzam N. Mansour, Fairfax Station, VA (US)

(73) Assignee: University of Miami, Miami, FL (US)

( * ) Notice: Subject to any disclaimer, the term of this patent is extended or adjusted under 35 U.S.C. 154(b) by 443 days.

(21) Appl. No.: 12/751,322

(22) Filed: Mar. 31, 2010

(65) Prior Publication Data

US 2011/0242730 A1    Oct. 6, 2011

(51) Int. Cl.
*H01G 9/155* (2006.01)
*H01G 9/02* (2006.01)
*H01G 9/022* (2006.01)

(52) U.S. Cl.
CPC .................................... *H01G 9/022* (2013.01)
USPC ........................................ 361/502; 252/62.2

(58) Field of Classification Search
USPC .................................. 361/502–503; 252/62.2
See application file for complete search history.

(56) References Cited

U.S. PATENT DOCUMENTS

| | | | |
|---|---|---|---|
| 4,485,154 A * | 11/1984 | Remick et al. | 429/448 |
| 5,392,191 A | 2/1995 | Thomas et al. | |
| 5,841,627 A | 11/1998 | Prakash et al. | |
| 6,198,623 B1 | 3/2001 | Amatucci | |
| 7,576,971 B2 | 8/2009 | Lipka et al. | |
| 2009/0061315 A1 * | 3/2009 | Nakano et al. | 429/218.1 |

\* cited by examiner

*Primary Examiner* — Eric Thomas
(74) *Attorney, Agent, or Firm* — Christopher & Weisberg, P.A.

(57) ABSTRACT

A solid state energy storage device has two electrodes, a membrane separator and a solid electrolyte having a substantially solid solvent, a salt and a mediator. The energy storage device stores electric charge by both Faradaic and non-Faradaic systems. The energy storage device may include activated carbon mixed with the electrolyte and sonicated to provide connection between the activated carbon and the mediator. The energy storage device is hot pressed to increase conductivity. The two electrodes may be asymmetric in amount of reduced and oxidized species of mediator.

10 Claims, 6 Drawing Sheets

SOLID STATE ENERGY STORAGE DEVICE AND METHOD

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant Number N000140810332 awarded by the Office of Navy Research.

CROSS-REFERENCE TO RELATED APPLICATION n/a

FIELD OF THE INVENTION

The invention relates to systems and methods of making solid state energy storage devices. More particularly, the invention relates to systems and methods of solid state electrochemical energy storage devices utilizing redox materials and electrochemical double layers to increase capacitance.

BACKGROUND OF THE INVENTION

Capacitors are used in electronic systems for a variety of functions, for example to block direct current while allowing alternating current to pass, smoothing the output of a power supply, reducing interference, and as sources for short, high power pulses of electric energy. A classic capacitor is formed by two conductive plates facing each other but separated by a nonconductive dielectric. When charge is introduced to one plate, an opposite charge forms on the other plate. The amount of energy stored in a capacitor, measured in farads, is dependent upon the surface area of the plates. Classic capacitors therefore grow in size and in mass as they grow in storage capacity. As with all electronics, there is a drive to produce capacitors capable of storing more charge, while decreasing the overall size of the capacitor.

Two types of electrochemical capacitors, electric double layer capacitors (EDLCs) and pseudo-capacitors, have been developed that store considerably more charge than classic capacitors within a given volume. Furthermore, these electrochemical capacitors, because of their high storage capacity, may function similarly to a rechargeable battery, as well as a capacitor. Because of their greatly increased specific energies and capacitances, these types of capacitors are often referred to as supercapacitors.

EDLCs store electrical energy at the interface between an electrolyte and an electrode. Storage of electrical charges is provided by electrostatic accumulation on the surface of the electrode, facilitated by non-Faradaic interaction between the charge of the electrode surface and the ions in the electrolyte. This electrical double layer allows a significant charge to build on the electrode. To increase the size, and thus the capacitance, of an EDLC, the size of the electrode/electrolyte interface is increased by using high surface area electrode materials, such as activated carbon, as the electrode material. Often a sulfuric acid solution serves as the electrolyte. The high surface area per gram provided by activated carbon greatly increases the size of the electric double layer, thus increasing the capacitance of the electrolytic capacitor.

More recently, the discovery of pseudo-capacitance has allowed the manufacture of capacitors with even greater charge storage capacity. Pseudo-capacitance materials undergo Faradaic reactions, reversibly transferring a charge to a material in contact with the electrode in a capacitor. This provides surface-accessible storage of charges at positions spaced from the surface.

Pseudo-capacitance is typically associated with surface reactions based on metal oxides. The metal oxides undergo charging or discharging by valence changes, accepting or surrendering one or more electrons in a Faradaic reaction with the electrode. The metal oxides typically used include ruthenium oxide ($RuO_2$), iridium oxide ($IrO_2$), nickel oxide (NiO), cobalt oxide ($CoO_x$), molybdenum oxide ($MoO_2$) and tungsten oxide ($WO_3$). These materials provide an accessible, reversible pseudo-capacitance in the range of milliFarad per gram to Farad per gram over a 1.4 volt range. Ruthenium oxide ($RuO_2$) has particularly favorable pseudo-capacitance properties. When $RuO_2$ is combined with active carbon electrodes, capacitance of 380 Farads/gram has been achieved.

However, this may be the limit for ruthenium oxide, with a maximum specific energy capacity of about 30 watt hour/kilogram. Often the metal oxide layer of a pseudo-capacitor is crystallized such that $RuO_2$ in the middle of the layer is inaccessible for electron transfer with the electrode, thus limiting the pseudo-capacitance of the material. Further, many suitable metal oxides are expensive and thus impractical for large scale use.

In addition, many pseudo-capacitors require liquid electrolytes to electrostatically balance the charges transferred to the oxide. Aqueous electrolytes can leak and corrode. They also limit the voltage and operating temperature of the capacitor. Solid state electrolytes are known, but they generally have low conductivity resulting in high internal resistance. This prevents a high specific power. Furthermore, the high cost of ruthenium and other suitable metals for the oxide layer hinders the wide application of these devices. Furthermore, many pseudo-capacitors degrade with use and are not suitable for applications requiring durable, long lasting electronics.

It is therefore desirable to provide an energy storage device having a high capacitance and a high specific energy. It is also desirable to provide a durable, high power energy storage device that does not require a liquid electrolyte. It is also desirable to provide a durable, high power energy storage device manufactured from inexpensive materials.

SUMMARY OF THE INVENTION

A solid state energy storage device comprises a first electrode, a second electrode, a separator membrane between the first electrode and the second electrode, a first electrolyte in contact with the first electrode and the separator membrane, the first electrolyte comprising dissociated salt ions, a mediator and a substantially solid solvent, and a second electrolyte in contact with the second electrode and the separator membrane, the second electrolyte comprising dissociate salt ions, a mediator and a substantially solid solvent, wherein the separator membrane is non-conductive, permeable to the dissociated salt ions and impermeable to the mediator.

A method of forming an energy storage device comprising the steps of mixing an aprotic polar polymer with a salt in a liquid solution to form a dissolved mixture, adding at least one mediator to the dissolved mixture, loading the mixture onto two electrodes and drying, and hot pressing a separator membrane between the two electrodes, thereby forming an energy storage device.

A method of forming an energy storage device comprising the steps of mixing an aprotic polar polymer with a salt in a liquid solution to form a dissolved mixture, adding at least one mediator to the dissolved mixture, adding active carbon to the dissolved mixture, sonicating the dissolved mixture for at least one hour, and loading the mixture onto a first side and a second side of a separator membrane and substantially removing the liquid solution.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

The present invention provides an energy storage device and methods of manufacture and use thereof. A single-cell double layer capacitor may have two electrodes which store charge separated by a permeable membrane separator. The membrane separator permits ion flow but is an electronic non-conductor. Each electrode is in contact with a current collector which provides electric current conduction out of the capacitor package for use. The electrodes and the membrane are filled with an electrolyte, and the entire assembly is contained in inert, non-conductive packaging. Multiple cells may be connected in series or in parallel in the final solid state package.

Figure 1:
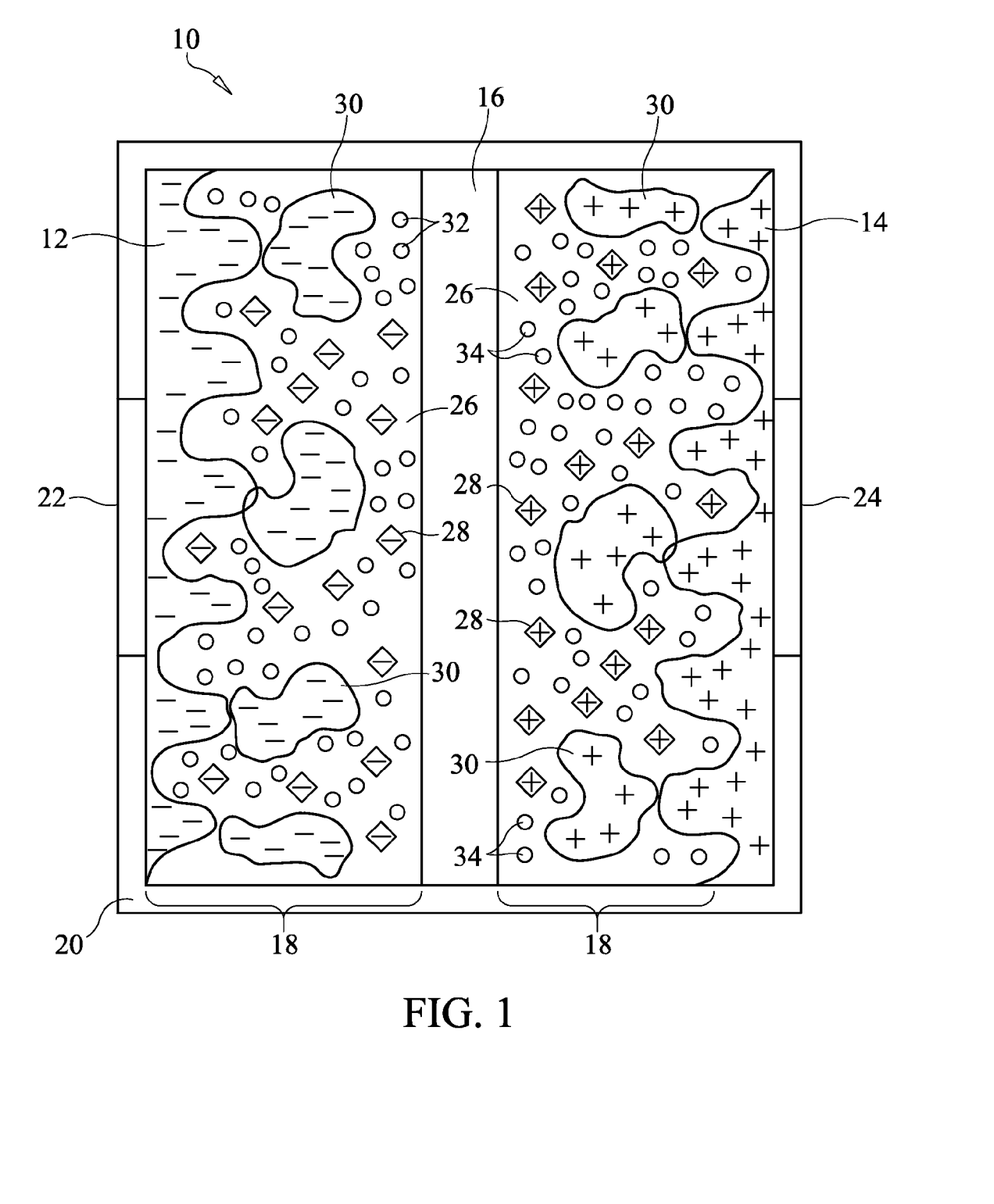
FIG. 1 is a diagram of a solid state energy storage device constructed in accordance with the principles of the invention.

Referring now to the drawing figures in which like reference designations refer to like elements, an embodiment of a solid state energy storage device 10 constructed in accordance with principles of the present invention is shown in FIG. 1. As used herein, "energy storage device," "capacitor" and "supercapacitor" all refer to a device capable of storing and releasing electrical charge. The solid state energy storage device 10 has a first electrode 12 and a second electrode 14 separated by a membrane separator 16. The electrodes 12 and 14 and the membrane 16 are electrolyte permeable and are immersed in the solid state electrolyte 18, and the entire assembly is enclosed within an inert, non-conductive packaging 20. A first current collector 22 provides electrical contact with the first electrode 12 and a second current collector 24 provides electrical contact with the second electrode 14.

The first and second electrodes 12 and 14 may be comprised of a material that is chemically inert, has high electric conductivity, and a high surface area to volume ratio. Materials suitable for use as the first and second electrodes 12 and 14 include porous carbon monoliths, carbon powder, carbon fiber, carbon cloth, carbon foam, carbon film and functional equivalents. Other suitable materials include porous or nanostructured non-porous carbon or carbon aerogels, carbon nanotubes, carbon foams or carbon nanofibers. Other suitable materials for the first and second electrodes 12 and 14 include fiber arrays, nano-structured materials such as carbon nanofiber arrays, and nano-structured graphite. Other materials having a high surface area accessible for ions and the other electrolyte molecules described herein are also suitable. Porous carbon, carbon with micro- or nano-structures suitable for ion intercalation, porous metal oxides and nanostructured metal oxides may also be suitable.

Carbon materials can form specific porous textures, providing high surface area. These porous materials may have relatively large pore diameters and good pore connectivity, so that an electrolyte may penetrate the pores, facilitating rapid ion motion and high conductivity. In this embodiment, activated carbon film have pores with widths in the range of 2 nanometers (nm) to 50 nm may be desirable, although materials with larger or smaller pore sizes may also be suitable. In addition, materials other than carbon that have high conductivity, a high surface area to volume ratio and are nonreactive with the other components of the energy storage device 10 may be suitable.

The membrane separator 16 may be substantially ion permeable and substantially non-electronically conductive. The membrane separator 16 may be made of a dense porous polymer film such as for example polyethylene, polypropylene, polytetrafluoroethylene, solid cross-linked polysiloxane polymer films or other materials that are nonconductive but allow ions to pass through. For example, a sulfonated tetrafluoroethylene based fluoropolymer-copolymer film, commercially available under the trade name Nafion®, may also be suitable for use as a membrane separator 16. The thickness may be, by way of example, in the range of 25 to 50 micrometers.

On the exterior surface of the energy storage device 10 are current collectors 22 and 24. These current collectors 22 and 24 may be electrically conductive metal plates or films made from materials such as, for example, aluminum, nickel, copper, molybdenum, titanium, steel, or any other electroconductive material suitable for use as current collectors. The remainder of the exterior surface of the energy storage device 10 may be covered by inert packaging 20 which is substantially nonreactive, nonconductive and durable.

The electrolyte 18 may be comprised of a substantially solid electrolyte solvent 26, a mediator 28, carbon powder 30 and a salt that dissociates into cations 32 and anions 34. The carbon powder 30 is suspended in the electrolyte but functions as part of the electrode, interacting non-Faradaically with the ions in the electrolyte. Thus the carbon powder 30 may be considered part of the electrode, part of the electrolyte or both. Optionally, the carbon powder 30 may serve as the entire electrode, without a substrate such as a carbon film or carbon cloth also acting as an electrode.

In this embodiment, the solvent 26 may be polyethylene oxide (PEO). Nafion® may also be used as a solvent. By way of example, the solvent 26 may optionally be a hydrocarbon solvent such as for example ethylene carbonate (EC), propylene carbonate (PC), diethylene carbonate (DEC) and dimethyl carbonate (DMC). The solvent may optionally be a polar solvent and may optionally be aprotic. The solvent may facilitate permeation of pores within an electrode by the electrolyte 18. A plasticizer, such as for example EC and PC, may optionally be added to the solvent.

The mediator 28 is susceptible to reduction/oxidation. For example, the mediator 28 may be a combination of ferrocene, ferricyanide, and ferrocyanide and/or iodide and iodine. The ferricyanide may be potassium ferricyanide ($K_3Fe(CN)_6$) which supplies $Fe^{3+}$ ions that may be rapidly and easily reduced. The ferrocyanide may be for example potassium ferrocyanide ($K_4Fe(CN)_6$) which supplies $Fe^{2+}$ ions that may be rapidly and easily oxidized. Iodide and iodine are available as sodium iodide (NaI) and iodine ($I_2$). Other mediators 28 that readily undergo redox reactions, accepting or donating an electron, may be suitable as mediators. Mediators 28 may be stable in both the reduced and oxidized state, allowing the mediators to retain a charge in order to facilitate greater capacitance for the energy storage device. It may also be desirable for mediators to have a high rate of exchange of charge from one mediator molecule to another.

A salt capable of substantial dissociation into a cation 32 and an anion 34 in the substantially solid solvent 26 may be included in the electrolyte 18. Lithium salts, for example lithium salts used in batteries, may be suitable. By way of example, suitable lithium salts include, but are not limited to lithium hexyluorophosphate ($LiPF_6$), lithium perchlorate ($LiClO_4$). lithium-bis-oxalatoborate ($LiB(C_2O_4)_2$), lithium-tetrafluoroborate ($LiBF_4$), lithium trifluoromethane-sulfonate (LiTFS) ($LiCF_3SO_3$), lithium(trifluoromethylsulfonyl)-imide, ($LiN(SO_2CF_3)_2$), and lithium-aluminum oxide ($LiAlO_2$). Suitable salts may dissociate into ions having one or more charges, for example di-cations and dianions. Non-reactive salts that undergo no oxidation, reduction or other chemical reactions with the other chemicals in the energy storage device may be suitable.

The carbon powder 30 is suspended within the electrolyte 18 and is in electrical contact with the electrodes 12 or 14. The carbon powder 30 increases the effective surface area of the electrode. Optionally, the electrolyte may not include any carbon powder 30. The electrode itself may optionally be comprised entirely of carbon powder.

Energy storage devices may be manufactured by mixing the components of a substantially solid electrolyte dissolved in a liquid solution. For example, an electrolyte may be formed by combining a polyethylene oxide (PEO) solid electrolyte solvent and a lithium salt in a liquid solution. Then an iodide/iodine mediator is added and dissolved. Next, the activated carbon powder is added to the solution. The admixture may then be sonicated to drive the redox mediator into the pores of the activated carbon powder. Sonication of the admixture may facilitate better electrical contact between the mediator and the carbon powder, thereby facilitating better charge transfer. Additional mediators and subsequent additional sonication may optionally be used to facilitate good electrical connection between the active carbon powder and the mediators.

Next, a carbon paper or carbon cloth electrode may be repeatedly dipped in the electrolyte liquid solution and dried, leaving only the components of the substantially solid electrolyte, including the carbon powder, on the electrode. A piece of the dried solid state electrolyte coated carbon paper or carbon cloth electrode is applied to each side of the polyethylene oxide or Nafion® separator membrane. Optionally, the separator membrane may be dipped repeatedly in the electrolyte liquid solution and dried, thereby forming electrodes from the carbon powder on either side of the separator membrane. Optionally, the electrolyte solution with mediators may be painted on both sides of the separator and then dried. After solidification, the thin layers on both sides of the separator can serve as electrodes.

The electrode/membrane/electrode assembly is then hot pressed to produce the solid state energy storage device. For example hot pressing may be at 4500 psi and 100° C. for 1 minute. The hot pressing substantially increases the capacitance of the energy storage device. Prior to the hot pressing, the solid electrolyte may be in a crystalline or semi-crystalline state. The crystalline or partially crystalline structure may inhibit contact between the redox mediator and the electrode materials and/or the carbon powder. The action of hot pressing the energy storage device transforms the structure of the electrolyte into a more amorphous state. This results in much better electrical connectivity between the mediator and the electrode materials.

The operation of the invention may be explained as follows. During operation, the electrodes 12 and 14, including the carbon powder 30, act as the active material in the capacitor. Applying an electric potential across the electrodes causes a double layer of opposing positive and negative charge to build up at the electrode/electrolyte interface of each electrode. This double layer covers both the electrodes 12 and 14, and also their associated carbon powder 30 that act as parts of the electrodes 12 and 14. This allows the energy storage device to build up charge in a non-Faradaic electric double layer.

Charge also reversibly transfers to the redox mediators 28 in the electrolyte solution. This Faradaic charge storage is similar to pseudo-capacitance and increases the charge that may be stored by the capacitor. This Faradaic charge storage by the mediators 28 is enhanced by the ions 32 and 34 surrounding the mediators 28, balancing their charges with surrounding opposite charges in a non-Faradaic double layer. Thus, the energy storage device has enhanced capacitance due to combining non-Faradaic, double layer capacitance with Faradaic, redox mediated pseudo-capacitance. Pseudocapacitors are limited in that only active molecules that are accessible by balancing ions may be charged. The energy storage device described here allows every mediator molecule to store charge because they are surrounded by ions in the electrolyte. In other pseudocapacitors, such as for example, $RuO_2$, only a portion of active materials can be accessible by ions and hence can be charged. The individual mediator molecules and the salt ions also remain mobile in the electrolyte, allowing the charges to approach counter ions. This reduces the effective resistivity and increases the effective conductivity and the power and energy that can be utilized are increased.

During charging of the anode, that is, the electrode 12 as shown in FIG. 1, the mediators 28 accept electrons from the electrode 12 to form a negative charge center in the electrolyte 18. Thus the electrode 12 can accommodate more charges because the mediators 28 in the electrolyte 18 are charged in addition to the charges that ordinarily accumulate at the electrode/electrolyte interface. The negative charge centers of the mediator 28 form molecular capacitors with the cations 32 in the electrolyte. This increases the contact area between the electrolyte 18 and active components including the electrode 12 and the carbon powder 30.

The amount of charge that may be stored by the mediators may be increased by loading the electrolyte surrounding each electrode differently. For example, the energy storage device 10 has an anodic electrode 12 and a cathodic electrode 14. The amount of charge storable in energy storage device 10 may be increased by loading the electrolyte in contact with anodic electrode 12 with more oxidized, and less reduced, mediator and by loading the electrolyte in contact with the cathodic electrode 14 with a surplus of reduced mediator and less oxidized mediator. This results in the electrodes 12 and 14 each being able to store more of their respective charges in the mediator. Such an energy storage device is loaded asymmetrically.

In one exemplary embodiment, an energy storage device is constructed in accordance with the principles of the invention using the following procedure.

First, polyethylene oxide (PEO) powder having an average molecular weight of 400,000 is mixed with lithium perchlorate ($LiClO_4$) powder and ethylene carbonate (EC). The mixture was dissolved in acetonitrile and then was stirred at 60° C. for about 4 hours until the mixture turned into a homogeneous translucent gel. The molar ratio of PEO monomer: lithium perchlorate:ethylene carbonate was 8:1:1. The weight ratio of acetonitrile solution:total weight of the mixture of solid components was 10:1.

Second, a mediator is added to the electrolyte gel. Sodium iodide (NaI) powder and iodine ($I_2$) crystals were added to the PEO gel. The weight ratio of PEO+$LiClO_4$+EC:sodium iodide-iodine was 1.85:1. In this embodiment, two weight ratios of sodium iodide:iodine, 10:1 and 1:10, were used in preparation of the electrodes. The first electrolyte for the first electrode, to be used as the anode, was mixed with sodium iodide:iodine in a ratio of 1:10. The second electrolyte for the second electrode, to be used as the cathode, was mixed with a sodium iodide:iodine ratio of 10:1. The use of different amounts of mediator species for the different electrodes results in an asymmetric energy storage device.

Sufficient deionized water is added to each electrolyte solution to dissolve all sodium iodide and iodine. The volume ratio of water:PEO gel was about 1:3. Activated carbon powder was added. The material was sonicated for at least 1 hour before use.

Third, another mediator, ferrocene powder, was added to the above prepared PEO gel electrode mixtures. The weight ratio of ferrocene powder:PEO+$LiClO_4$+EC was varied between 1:10 to 2:10. For these weight ratios of ferrocene: PEO gel, ferrocene dissolved completely without addition of water. No additional activated carbon powder was added. The gel was sonicated for at least 1 hour before use.

Fourth, potassium ferricyanide ($K_3Fe(CN)_6$) and potassium ferrocyanide ($K_4Fe(CN)_6$) mediators were added to the PEO gel electrolyte mixture. Potassium ferricyanide ($K_3Fe(CN)_6$) powder and potassium ferrocyanide trihydrate ($K_4Fe(CN)_6 \cdot 3H_2O$) crystals were added to the prepared PEO gel. The weight ratio of the mediators:PEO+$LiClO_4$+EC may vary between 0.01 and 0.2. The weight ratio of potassium ferricyanide:potassium ferrocyanide may also vary for the electrolyte mixtures. Sufficient deionized water was added to completely dissolve the potassium ferricyanide or potassium ferrocyanide. The volume ratio of water:PEO gel was generally 1:3. Activated carbon powder was added. The material may be again sonicated for at least 1 hour before use.

Nanofoam carbon paper having a density of 0.25-1.0 gram/$cm^3$, a surface area of about 400 $m^2$/gram, an average pore size of about 0.7 nm, an electrical resistivity of about 0.010-0.040 ohm-cm and a capacitance of about 30 farad/gram may be used as the substrate electrode.

Fifth, the prepared PEO electrolyte gels were dropped on the nanofoam carbon paper. The loading is repeated several times. After loading with the PEO electrolyte gels, the electrodes were dried in air for about 12 hours and then placed in a plastic bag. The same procedure may be used, replacing the nanofoam carbon paper with carbon cloth, carbon felt or other electrolyte materials. As a result of the drying, a substantially solid electrolyte permeates the electrode material.

Sixth, a piece of Nafion® 117 membrane (sulfonated polytetrafluoroethylene) is immersed in 0.5 M sulfuric acid at room temperature for 2 hours. The energy storage device is assembled by placing two carbon electrodes (1.0-2.5 $cm^2$) loaded with mediator on either side of a Nafion® membrane. The assembly is then hot pressed at about 4500 psi and 702° C. for 1 minute.

In another exemplary embodiment, Nafion® is used as a solvent for the substantially solid electrolyte. A Nafion® 117 solution containing 5% Nafion® ionomer is prepared, with the balance made up with aliphatic alcohols and water to form a liquid solution.

Sodium iodide (NaI) powder and iodine ($I_2$) crystals are added to the Nafion® solution to serve as mediators. The weight ratio of Nafion® ionomer to mediators may vary from 0.37:1 to 0.5:1. Activated carbon may also be added. The weight ratio of Nafion® ionomer:activated carbon may vary from 1:1 to 3.7:1. The molar ratio of iodine:sodium iodide may vary from 1:10 to 10:1. Water may be added to the Nafion® solution to completely dissolve the mediators. The mixture was then sonicated at least 1 hour before use.

Next, ferrocene ($Fe(C_5H_5)_2$) powder is added to a Nafion® solution to serve as a mediator. The weight ratio of Nafion® ionomer:mediator may vary from 1:1 to 6:1. The weight ratio of Nafion® ionomer:activated carbon powder was 1:1 to 1.2: 1. The components may dissolve completely without addition of water or may require the addition of water to completely dissolve. The mixture may then be sonicated at least 1 hour before use.

Nanofoam carbon paper, serving as the electrodes that are also a substrate for the substantially solid electrolyte, may be dipped into the Nafion® mixtures, withdrawn and dried. This may be repeated several times. Optionally, the electrode material may be carbon paper, carbon cloth, or carbon felt.

Next, a Nafion® 117 membrane is immersed in 0.5 M sulfuric acid at room temperature for 2 hours. The sandwich of two carbon electrodes loaded with mediator and a Nafion® membrane, having an area of 1.0-2.5 $cm^2$, is hot pressed at about 4500 psi at 70° C. for 1 minute to form a energy storage device assembly.

Capacitance, the measure of electrical charge stored between two surfaces, is calculated according to the formula:

$$C = q/\Delta V$$

Where: C is capacitance (farad)

q is charge (coulomb)

$\Delta V$ is potential difference (volt)

Cyclic voltammetry (CV) may also be used to make potentio-dynamic measurements of a redox cell or capacitor. The magnitude of the current is related to the slope of the line as described by Fick's laws.

$$I_t = nFAD_o(\partial C_o/\partial X)_X$$

Wherein: $I_t$=Current, amperes at time t, seconds.
n=number of electrons, equivalents/mole.
F=Faraday constant, 96,485 electrons/equivalent.
A=Electrode area, square centimeters.
$D_o$=Diffusion coefficient of oxidized species, square centimeters/second.
$C_o$=Concentration of oxidized species, moles/cubic centimeter.
X=Distance from the electrode, centimeters.
The product $D_o(\partial C_o/\partial X)_X$ at x=0, t is the flux of oxidized species diffusing per unit time to unit area of the electrode in moles/cm²s.

When there is an apparent diffusivity of the mediators (A as the oxidized and AX as the reduced states), $D^*_{AX}$ the solid electrolyte is given by:

$$D^*_{AX} = D_{AX} + \frac{k\delta^2_{AX}\pi}{6} C_A \quad (1)$$

where $D_{AX}$ is the diffusivity for conventional or physical diffusion, k is the charge exchange reaction rate among the mediators, $C_A$ is the concentration of A. The first term is actually $D_0$. The second term is so-called transfer diffusion. Conductivity, σ, of a species is related with the diffusivity, $D^*_{AX}$, via Nernst-Einstein equation, $$\sigma = \frac{ze^2}{kT} D^*_{AX}. \quad (2)$$

Thus, the apparent diffusivity and conductivity of mediators is much greater than those of ions that can't transfer electrons among them, such as $Li^+$, $Cl^-$, and $Na^+$.

The current will decrease when all the mediators in the entire electrolyte body are oxidized or reduced. This is because as expressed in 1) the charge or electron can be quickly transferred.

One of the electrodes of an energy storage device assembled as described above may be used as the working electrode and the other one as the counter electrode in order to determine their capacitance. For three electrode measurements, silver gauze electrochemically coated with AgCl in concentrated HCl solution may be used as a reference electrode. In general, only the working and counter electrodes are used and the reference electrode is not used. The potential scanning rate may be between 5 mv/s and 35 mV/s. Chronoamperometry, charge/discharge measurements, may also be conducted. In these measurements, an energy storage device is first charged at a non-zero potential for 100 seconds and then discharged at 0 volts.

A capacitor having two nanofoam carbon paper electrodes and loaded with PEO electrolyte and activated carbon, but no mediator, has the characteristics shown in Table 1.

TABLE 1

Two nanofoam carbon paper electrodes loaded
with PEO electrolyte and activated carbon

| Weight of Activated Carbon | 24.1 mg |
| Specific Capacitance | 19.1 F/g |

TABLE 1-continued

Two nanofoam carbon paper electrodes loaded
with PEO electrolyte and activated carbon

| Specific Power | 0.82 kW/kg |
| Specific Energy | 4.48 Wh/kg |
| Mass of Assembly | 81.8 mg |
| Specific Capacitance | 5.68 F/g |
| Specific Power | 0.24 kW/kg |
| Specific Energy | 1.32 Wh/kg |

A solid-state polymer electrolyte may have a lower specific capacitance than a liquid electrolyte because many more pores of the carbon are accessible to liquid than to solid electrolyte. Therefore, a 19 farad/g value of specific capacitance on the carbon electrode with the PEO electrolyte was a high value. However, when the weight of the nanofoam carbon paper (48 mg) is considered, the specific capacitance was only 5.68 farad/g. This may be a reasonable value for a solid-state electrolyte based EDLC without a mediator as described herein.

Figure 2:
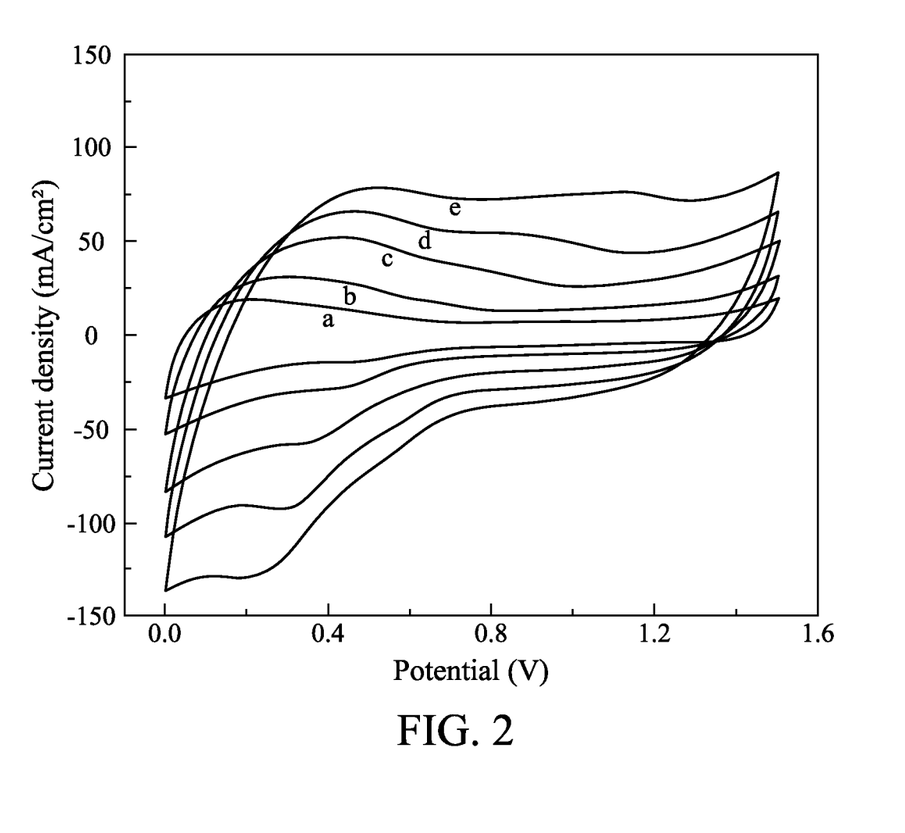
FIG. 2 is a set of cyclic voltammograms of an asymmetric supercapacitor loaded with iodine ($I_2$) and sodium iodide (NaI) for scanning rates of (a) 25, (b) 50, (c) 100, (d) 150 and (e) 200 $mVs^{-1}$.
Figure 3:
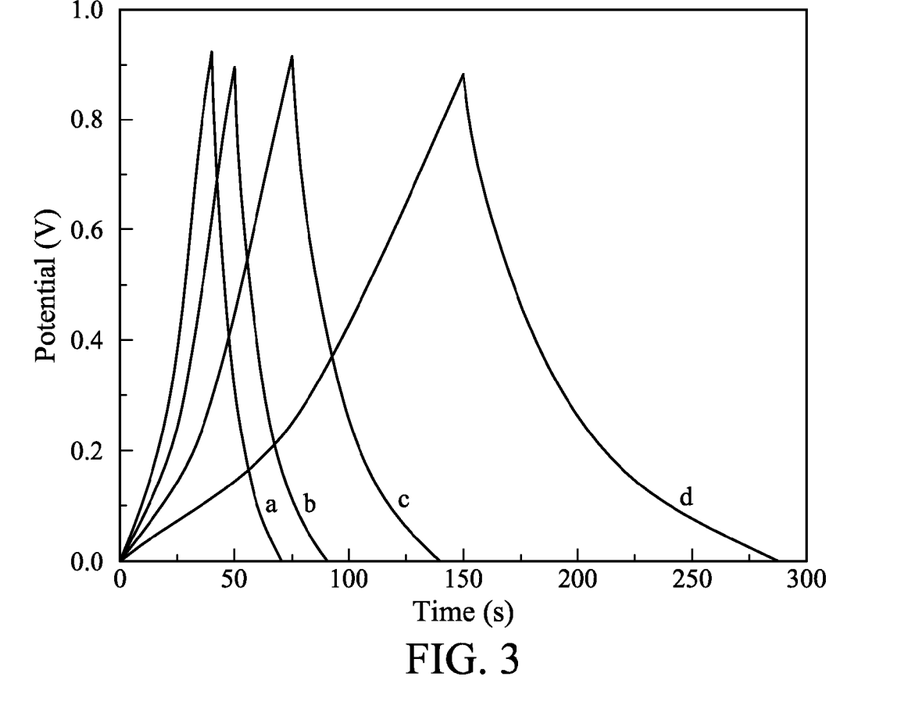
FIG. 3 is a charge/discharge diagram of the asymmetric energy storage device loaded with an iodine($I_2$)/iodide {NaI} mediator of FIG. 2 at constant current densities of (a) 25, (b) 50, (c) 100, (d) 150 and (e) 200 $mVs^{-1}$.

FIG. 2 shows the substantially symmetric cyclic voltammetry curves from an energy storage device with asymmetric electrodes, each containing 5.185 mg of NaI, 0.519 mg of $I_2$, and 10 mg of activated carbon. The cyclic voltammetry curves show both an oxidation and a reduction peak, demonstrating the effect of redox, Faradaic reactions of the mediators and their pseudo-capacitance. However, the peaks are not as pronounced as in more classic cyclic voltammograms of redox cells. This may be due to the non-Faradaic contributions to the energy storage system. FIG. 3 shows a charge/discharge diagram of the asymmetric energy storage device of FIG. 2 loaded with an iodine($I_2$)/iodide {NaI) mediator.

Figure 4:
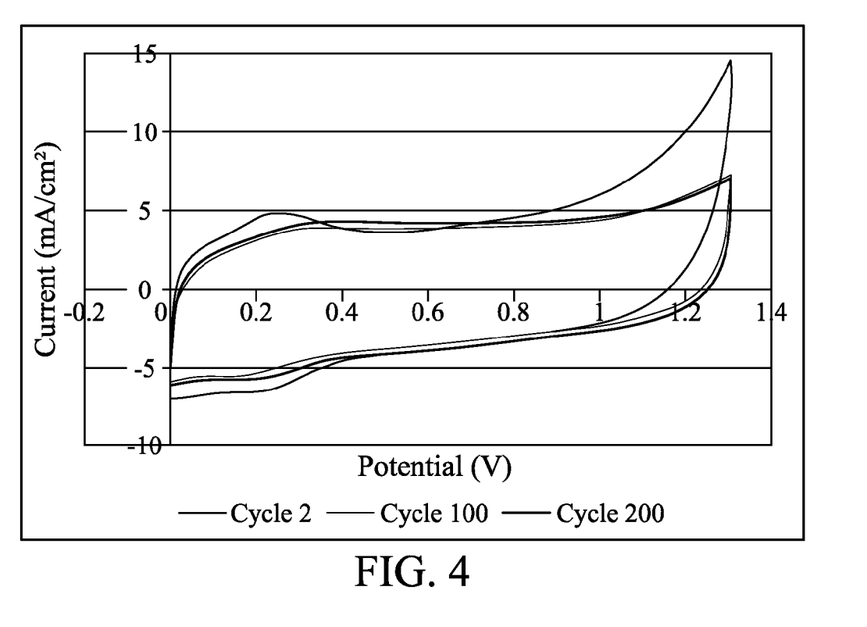
FIG. 4 is a cyclic voltammetry diagram of symmetric energy storage device electrodes loaded with a ferrocene mediator for cycles 2, 100 and 200.

FIG. 4 is a cyclic voltammetry diagram of symmetric energy storage device electrodes loaded with a ferrocene mediator. The CV is substantially symmetrical, illustrating the symmetry of the electrodes and electrolyte.

A second test was conducted with similar electrodes, but with additional mediator. In the second test the potential range was from 0.0 to −1.3 V. The results of these two tests are reported in Table 2. The specific capacitance of the energy storage devices having mediators is greater than that of the electrodes without a mediator.

TABLE 2

Symmetric energy storage device with two
identical electrodes loaded with NaI/$I_2$

| Test | Weight of Mediator NaI/$I_2$, mg | Specific Capacitance, F/g | Specific Power, kW/kg | Specific Energy, Wh/kg |
| --- | --- | --- | --- | --- |
| 1<br>0.0 to +1.3 V | 5.704 mg<br>(5.185/0.519) | 113. | 9.62 | 32.8 |
| 2<br>0.0 to −1.3 V | 8.036 mg<br>(7.305/0.731) | 182. | 2.31 | 16.5 |

A symmetric energy storage device with two nominally identical electrodes was loaded with iodide/iodine (NaI/$I_2$) mediators. The properties are evaluated based on the weight of the mediators. The peak value of the CV curve decreases with number of cycles. Table 3 shows that the specific capacitance, power, and energy are greater than those in the previous measurements. The specific power and energy reach maximum values in the 10th cycle but start to decrease after the 10th cycle. After the 50th cycle, the specific power and energy become stable.

In another exemplary embodiment, two symmetric energy storage device electrodes loaded with iodide/iodine ($NaI/I_2$) mediators were hot pressed at 100° C. and 3000 psi. Hot pressing eliminated water and increased the ionic conductivity of the electrodes. The results are reported in Tables 3, 4 and 5. The weight specific properties are evaluated based on the weight of the mediators. The specific energy of this energy storage device reached 13.58 Wh/kg with respect to the weight of the assembly.

TABLE 3

Symmetric energy storage device with two electrodes loaded with $NaI/I_2$. Evaluation based on weight of mediator.

| Cycle | Weight of Mediators $NaI/I_2$, mg | Specific Capacitance, F/g | Specific Power, kW/kg | Specific Energy, Wh/kg |
|---|---|---|---|---|
| 2 | 3.159 mg | 234. | 3.46 | 65.7 |
| 10 | (2.872/0.287) | 254. | 3.75 | 78.2 |
| 50 | | 197. | 2.93 | 58.7 |
| 100 | | 184. | 3.11 | 54.3 |

TABLE 4

Symmetric energy storage device with two electrodes loaded with $NaI/I_2$ and hot pressed. Evaluation based on weight of $NaI/I_2$.

| Cycle | Weight of Mediator $NaI/I_2$, mg | Specific Capacitance, F/g | Specific Power, kW/kg | Specific Energy, Wh/kg |
|---|---|---|---|---|
| 9 | Positive Electrode | 240. | 4.22 | 93.5 |
| 10 | 4.499 mg | 250. | 4.42 | 99.2 |
| 11 | (4.09/0.409) | 254. | 4.52 | 101. |
|  | Negative Electrode | | | |
|  | 3.812 mg | | | |
|  | (0.347/3.465) | | | |

TABLE 5

Symmetric energy storage device with two electrodes loaded with $NaI/I_2$ and hot pressed. Evaluation based on weight of assembly.

| Cycle | Weight of Whole Assembly | Specific Capacitance, F/g | Specific Power, kW/kg | Specific Energy, Wh/kg |
|---|---|---|---|---|
| 9 | 60.7 mg | 32.9 | 0.58 | 12.8 |
| 10 | | 34.3 | 0.61 | 13.6 |
| 11 | | 34.9 | 0.62 | 13.8 |

One difference between the pseudocapacitance with $RuO_2$ and other semiconductor oxides and that with the $Na/I_2$ mediators as described herein is that not all $RuO_2$ molecules in the crystals are accessible by hydrogen ions. Therefore, the redox reaction $RuO_x(H_2O)_y = RuO_{(x+d)}(H_2O)_{(y-d)} + (2d)H^+ + (2d)e^-$ can not be completed for all $RuO_2$ molecules. A large portion of $RuO_2$ molecules are not employed for charge storage. In the case of mediators in a substantially solid electrolyte, substantially all mediator molecules are surrounded by ions in the electrolyte. The reaction, $3NaI = (Na^+I_3^-) + 2Na^+ + 2e^-$ for each mediator molecule proceeds without limitation of accessibility of ions. Every mediator molecule can be used as a site for charge storage.

Mediator molecules do not substantially agglomerate or crystallize in the electrolyte. Even when the concentration of $NaI/I_2$ is high, as great as 20 wt %, in the PEO electrolyte, there is no crystallization of $NaI/I_2$. The mediator molecules are completely dissolved in the PEO electrolyte. As a result, substantially all of the iodide/iodine in the electrolyte converts between oxidized and reduced states.

An asymmetric energy storage device with two electrodes loaded with iodide/iodine ($NaI/I_2$) mediator was prepared. The positive electrode included 2.747 g of NaI and 0.275 g of $I_2$. The negative electrode included 0.383 g of NaI and 3.830 g of $I_2$. That is, the positive electrode contained more reduced active material ($I^-$), while the negative electrode contained more oxidized active materials ($I_2$). Therefore, the positive electrode could accommodate more positive charges via oxidizing the reduced active material while the negative electrode could accommodate more negative charges via reducing the oxidized material. The cyclic voltammetry (CV) curves of 300 cycles for an asymmetric energy storage device were recorded. The summary of test results is listed in Table 6.

TABLE 6

Asymmetric energy storage device with two electrodes loaded with $NaI/I_2$. Evaluation based on weight of the mediator.

| Cycle | Weight of Mediator $NaI/I_2$, mg | Specific Capacitance, F/g | Specific Power, kW/kg | Specific Energy, Wh/kg |
|---|---|---|---|---|
| 2 | Positive Electrode | 141. | 1.56 | 33.5 |
| 100 | 3.022 mg | 72. | 1.34 | 21.3 |
| 150 | (2.747/0.275) | 113. | 1.62 | 34.3 |
| 200 | Negative Electrode | 108. | 1.61 | 32.4 |
| 300 | 4.213 mg | 96. | 1.74 | 27.1 |
|  | (0.383/3.830) | | | |

The asymmetric energy storage device with two electrodes loaded with iodide/iodine ($NaI/I_2$) mediators was evaluated based on the weight of the mediators. Results are reported in Table 7.

TABLE 7

Asymmetric energy storage device with two electrodes loaded with $NaI/I_2$. Evaluation based on weight of mediator.

| Cycle | Weight of Mediator, $NaI/I_2$, mg | Specific Charge, C/g | Specific Discharge, C/g | Ratio | Specific Power, kW/kg | Specific Energy, Wh/kg |
|---|---|---|---|---|---|---|
| 2 | Positive | 217. | −235. | 108.% | 20.7 | 60.4 |
| 25 | Electrode | 218. | −203. | 93.4% | 55.4 | 60.6 |
| 50 | 4.773 mg | 286. | −249. | 87.2% | 56.8 | 79.5 |
| 75 | (4.339/0.434) | 278. | −223. | 80.3% | 31.2 | 77.2 |
| 1002 | Negative | 273. | −220. | 80.3% | 30.4 | 76.0 |
|  | Electrode | | | | | |
|  | 4.146 mg | | | | | |
|  | (0.377/3.769) | | | | | |

The asymmetric energy storage device with two electrodes loaded with iodide/iodine ($I^-/I_2$) mediators was evaluated based on the weight of the whole assembly. Results are reported in Table 8.

TABLE 8

Asymmetric energy storage device with two electrodes loaded with $NaI/I_2$. Evaluation based on weight of whole assembly.

| Cycle | Weight of Whole Assembly | Specific Charge, C/g | Specific Discharge, C/g | Ratio | Specific Power, kW/kg | Specific Energy, Wh/kg |
|---|---|---|---|---|---|---|
| 2 | 75.0 mg | 25.9 | −28.0 | 108.% | 2.47 | 7.19 |
| 25 | | 25.9 | −24.2 | 93.4% | 6.59 | 7.20 |
| 50 | | 34.0 | −29.7 | 87.2% | 6.76 | 9.45 |

TABLE 8-continued

Asymmetric energy storage device with two electrodes loaded with NaI/I$_2$. Evaluation based on weight of whole assembly.

| Cycle | Weight of Whole Assembly | Specific Charge, C/g | Specific Discharge, C/g | Ratio | Specific Power, kW/kg | Specific Energy, Wh/kg |
|---|---|---|---|---|---|---|
| 75 | | 33.0 | −26.5 | 80.3% | 3.71 | 9.18 |
| 100 | | 32.6 | −26.1 | 80.3% | 3.62 | 9.04 |

A chronoamperometry or charge/discharge curve for two electrodes loaded with iodide/iodine is shown in FIG. 3. Each cycle of the chronoamperometry is converted into a curve of charge or discharge versus time by $$Q(t) = \int i \, dt$$

The energy or work done by charging is evaluated by $$E(t) = \int iV \, dt = V \int i \, dt = QV$$

Figure 5:
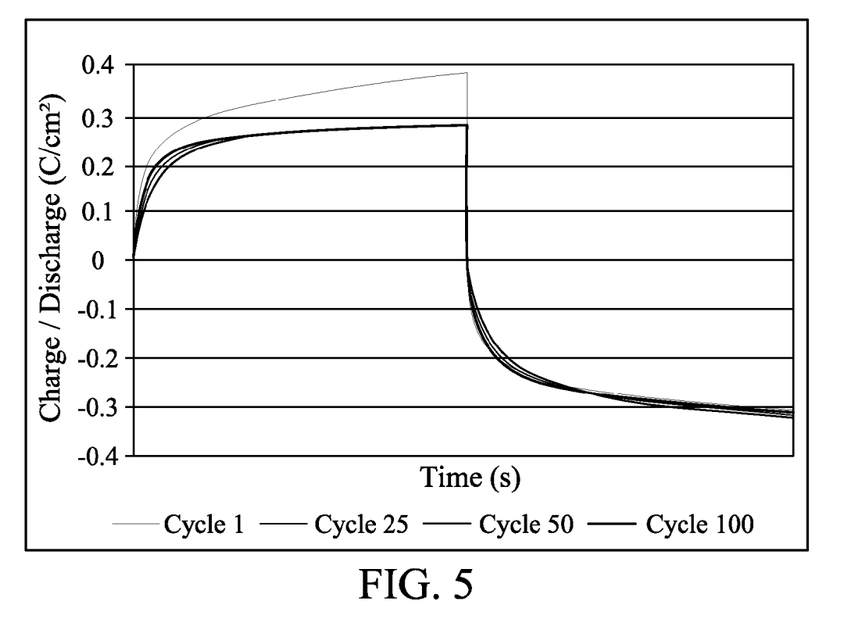
FIG. 5 is a diagram of charge/discharge of energy storage device electrodes loaded with a ferrocene mediator for cycles 1, 25, 50 and 100.

The integration results (charge/discharge vs. time) are illustrated in FIG. 5.

In Table 8, the charge/discharge is symmetric because the ratio of discharge to charge was greater than 80%. This ratio for the second charge/discharge cycle was greater than 100%. This was probably a result of the charge stored in the first half cycle not being completely discharged in the first discharge half cycle. This caused a small amount of residual charge to be discharged in the second discharge cycle.

The theoretical specific charge is 303 C/g for one electron transfer.

The theoretical specific charge is 606 C/g for two electron transfer that may occur at 1.20 V or greater.

The specific charge data obtained in this test indicated that in order to enable a higher specific charge, a more positive potential was required. The specific power and energy with respect to the active materials or mediator are very high. The specific power with respect to the entire energy storage device assembly was between 2.47 and 6.76 kW/kg. The specific power of about 10 Wh/kg was greater than that for other types of solid-state energy storage devices.

Cyclic voltammetry results for symmetric ferrocene mediated PEO electrolyte energy storage devices are shown in FIG. 4 and reported in Table 9. The big peak in the second cycle was due to oxidation/reduction of water. In the 100$^{th}$ and 200$^{th}$ cycle the big peak was not present. This indicated that the residual water in the electrodes was consumed. The small peaks in the 100$^{th}$ and 200$^{th}$ cycles were due to redox reactions of ferrocene. There was no significant change between the 100$^{th}$ and 200$^{th}$ cycles. The specific capacitance obtained was close to the theoretical value of 214 F/g.

Charge/discharge curves for a symmetric energy storage device with mediated PEO electrolyte are reported in FIG. 5. The charge/discharge measurements are shown in Tables 10 and 11. The discharge value was greater than the charge value for all cycles, except the second cycle. The specific charge and discharge values, the specific power, and specific energy becomes stable after the 25 cycle. The specific power is between 2.29 and 3.79 kW/kg based on the weight of the whole assembly. The specific energy is between 2.54 and 3.52 Wh/kg based on the weight of the whole assembly.

TABLE 9

Symmetric energy storage device with two identical electrodes loaded with ferrocene. Evaluation based on weight of mediator.

| Cycle | Weight of Mediator, Ferrocene | Specific Capacitance, F/g | Specific Power, kW/kg | Specific Energy, Wh/kg |
|---|---|---|---|---|
| 2 | 1.023 mg | 184. | 18.5 | 74.9 |
| 100 | | 167. | 9.18 | 53.0 |
| 200 | | 169. | 9.03 | 54.6 |

TABLE 10

Symmetric energy storage device with two identical electrodes loaded with ferrocene. Evaluation based on weight of mediator.

| Cycle | Weight of Mediator, Ferrocene | Specific Charge, C/g | Specific Discharge, C/g | Ratio | Specific Power, kW/kg | Specific Energy, Wh/kg |
|---|---|---|---|---|---|---|
| 2 | 1.785 mg | 215. | −173. | 80% | 64.1 | 59.6 |
| 25 | | 155. | −174. | 112% | 54.4 | 43.1 |
| 50 | | 154. | −178. | 115% | 48.6 | 42.8 |
| 100 | | 155. | −180. | 116% | 38.7 | 43.0 |

TABLE 11

Symmetric energy storage device with two identical electrodes loaded with ferrocene. Evaluation based on weight of whole assembly.

| Cycle | Weight of Whole Assembly | Specific Charge, C/g | Specific Discharge, C/g | Ratio | Specific Power, kW/kg | Specific Energy, Wh/kg |
|---|---|---|---|---|---|---|
| 2 | 30.2 mg | 12.7 | −10.2 | 80.8% | 3.79 | 3.52 |
| 25 | | 9.17 | −10.3 | 112.1% | 3.22 | 2.55 |
| 50 | | 9.11 | −10.5 | 115.4% | 2.87 | 2.53 |
| 100 | | 9.16 | −10.7 | 116.8% | 2.29 | 2.54 |

Energy storage device with potassium ferricyanide (K$_3$Fe(CN)$_6$) mediator and energy storage device with potassium ferrocyanide (K$_4$Fe(CN)$_6$) mediator in PEO gel.

Figure 6:
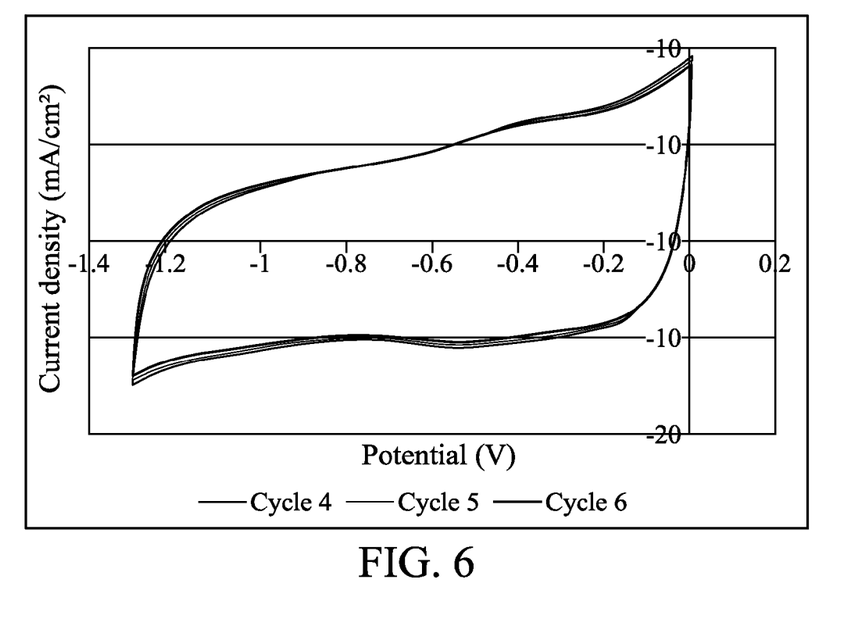
FIG. 6 is a cyclic voltammetry diagram of an energy storage device with a first electrode loaded with a polyethylene oxide electrolyte solvent and a mostly ferricyanide mediator and a second electrode loaded with a polyethylene oxide electrolyte solvent and a mostly ferrocyanide mediator for cycles 4, 5 and 6.

The CV curves of a energy storage device loaded with potassium ferricyanide (K$_3$Fe(CN)$_6$) and potassium ferrocyanide (K$_4$Fe(CN)$_6$) mediators are shown in FIG. 6. The measurements are summarized in Table 12. The specific capacitance with respect to the weight of the mediator is 242.2 F/g, close to the theoretical value. The specific power with respect to the weight of the energy storage device assembly is about 1 kW/kg. Because of the limited solubility of the mediators in the PEO solution, the loading of the mediators may be as low as 5% of the total weight of the electrodes.

Figure 7:
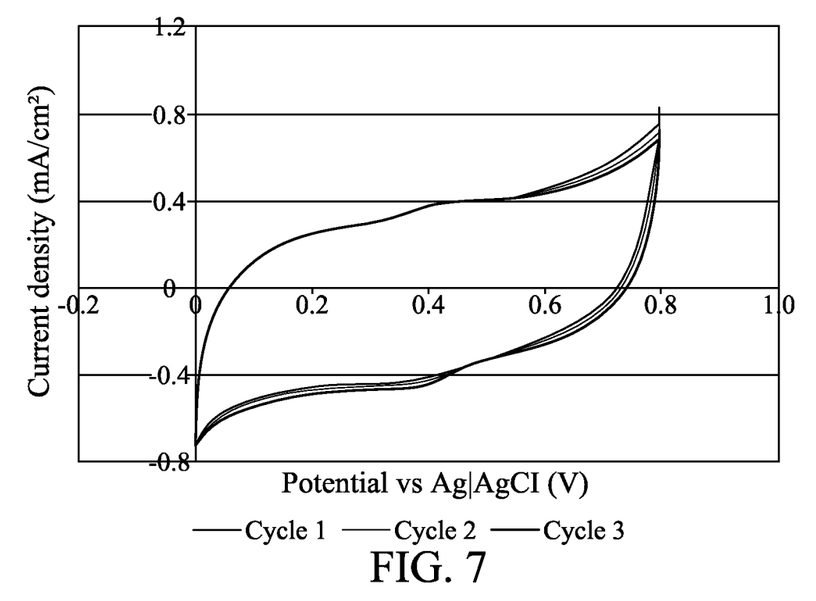
FIG. 7 is a cyclic voltammetry diagram of an energy storage device having electrodes loaded with Nafion® and activated carbon for cycles 1, 2 and 3.

The performance of the energy storage device is improved by using an asymmetric configuration where the positive electrode contains (K$_4$Fe(CN)$_6$)·3H$_2$O and the negative electrode contained (K$_3$Fe(CN)$_6$). The positive electrode tends to give off electrons while the negative electrode tends to receive electrons. The results are shown in FIG. 7 and in Tables 13 and 14. The potential window, cycle stability, and specific energy on the basis of the weight of the assembly are improved.

TABLE 12

Symmetric energy storage device with potassium ferricyanide and potassium ferrocyanide in PEO. Evaluation based on the weight of the mediator and the weight of the whole assembly.

| | Specific Capacitance, F/g | Specific Power, kW/kg | Specific Energy, Wh/kg |
|---|---|---|---|
| Weight of Mediator $K_3Fe(CN)_6/K_4Fe(CN)_6 \cdot 3H_2O$ | | | |
| 1.649 mg (0.710/0.939) | 242. | 18.71 | 21.59 |
| Weight of Whole Assembly | | | |
| 35.8 mg | 11.16 | 0.86 | 0.99 |

TABLE 13

Asymmetric energy storage device consisting of two electrodes loaded with potassium ferricyanide ($K_3Fe(CN)_6$) in the negative electrode and potassium ferrocyanide ($K_4Fe(CN)_6$) in the positive electrode. Evaluation based on the weight of mediators.

| Scanning rate, mV/s | Cycle | Weight of Mediators, mg | Specific Capacitance, F/g | Specific Power, kW/kg | Specific Energy, Wh/kg |
|---|---|---|---|---|---|
| 20 | 2 | Positive | 231. | 12.3 | 79.5 |
| | 20 | 1.742 mg | 198. | 9.36 | 67.4 |
| 5 | 2 | ($K_4Fe(CN)_6 \cdot 3H_2O$) | 256. | 4.54 | 90.1 |
| | 20 | Negative 1.696 mg ($K_3Fe(CN)_6$) | 229. | 3.93 | 81.2 |

TABLE 14

Asymmetric energy storage device consisting of two electrodes loaded with potassium ferricyanide ($K_3Fe(CN)_6$) in the negative electrode and potassium ferrocyanide ($K_4Fe(CN)_6$) in the positive electrode. Evaluation based on the weight of the whole assembly.

| Scanning rate, mV/s | Cycle | Weight of Whole Assembly | Specific Capacitance, F/g | Specific Power, kW/kg | Specific Energy, Wh/kg |
|---|---|---|---|---|---|
| 20 | 2 | 52.6 mg | 15.1 | 0.80 | 5.20 |
| | 20 | | 12.9 | 0.61 | 4.41 |
| 5 | 2 | | 16.7 | 0.30 | 5.89 |
| | 20 | | 15.0 | 0.26 | 5.31 |

In order to establish a baseline for evaluation of Nafion® electrolyte based energy storage devices, an energy storage device containing activated carbon but no mediator was tested. The results are shown in FIG. 7. The cyclic voltammetry was similar to that obtained in liquid electrolyte. However, the specific capacitance for the assembly (working electrode, membrane, and counter electrode) was only 0.239 F/g, assuming a voltage of 1 V. The low capacitance was probably due to the lack of accessibility of the Nafion® electrolyte to the pores of the activated carbon powder.

Figure 8:
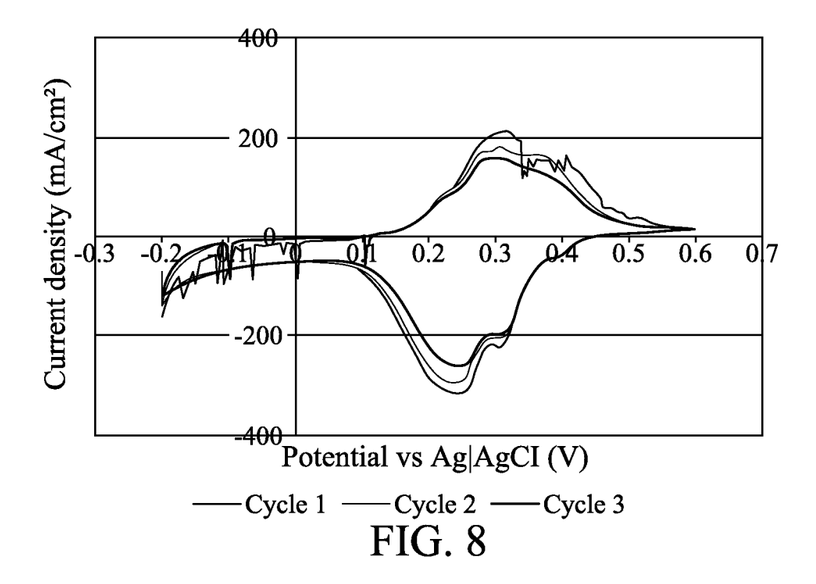
FIG. 8 is a cyclic voltammetry diagram of energy storage device electrodes loaded with Nafion® and iodine ($I_2$) and sodium iodide (NaI) mediators.

FIG. 8 shows cyclic voltammetry measurements made for an iodide/iodine ($NaI/I_2$) mediator enhanced Nafion® energy storage device. The specific charge was 625 C/g with respect to the electrode weight (ca. 0.016 g) or 167 C/g with respect to the whole assembly weight (ca. 0.06 g including separator, counter electrode and working electrode). The specific capacitance with respect to the electrode weight was 625 F/g. This specific capacitance is similar to the specific capacitance of $RuO_2$ electro-active material and may be greater than that of doped conducting polymer in liquid electrolyte. The specific energy with respect to the assembly weight was 23 Wh/kg. The peak current density of this energy storage device may be about 0.4 A/cm² and the maximum power density may be about 0.12 W/cm² or 2 kW/kg.

Crossover of water and methanol in Nafion® membrane based polymer electrolyte fuel cells is known and has been extensively reported. The crossover of water in polymer electrolyte fuel cells is due to electro-osmotic drag driven by transport of protons. In the working electrode of the energy storage device, the molar concentrations of NaI and I are equal. $I^-$ is generated from NaI while $I_3^-$ is generated by the following reaction:

$$I^- + I_2 \rightarrow I_3^-$$

In the positive polarization half cycle, $I^-$ is oxidized to $I_3^-$ as described by the following reaction.

$$3Na^+ + 3I^- - 2e^- \rightarrow 3Na^+ + I_3^-$$

Electro-osmotic drag from the working electrode to the counter electrode drives clusters of $Na^+$ and $I_3^-$ together with water molecules to the counter electrode. At the counter electrode, $I_3^-$ is reduced to $I^-$ as follows.

$$2H^+ + Na^+ + I_3^- + 2e^- \rightarrow H^+ + Na^+ + 3I^- \rightarrow NaI + 2HI$$

The overall effect is the loss of positive charge in the working electrode. Consequently, in the negative polarization half cycle, the current density peak is not as high as that in the positive polarization half cycle.

Seven energy storage devices fabricated with Nafion® electrolyte, activated carbon, and ferrocene mediator in the electrodes were tested. The measurements are summarized in Tables 15 and 16. The specific capacitance for these ferrocene mediated energy storage devices was greater than that for the energy storage device without mediator. However, the specific power and energy are lower than the desired values.

TABLE 15

Symmetric energy storage device with electrode containing Nafion®, activated carbon, and ferrocene. Evaluation based on the weight of ferrocene except for experiment labeled I where the weight of carbon was used since in that case the electrode has no ferrocene.

| | Nafion®:Activated Carbon:Ferrocene, weight | Weight of Carbon/Ferrocene, mg | Specific Capacitance, F/g | Specific Power, kW/kg | Specific Energy, Wh/kg |
|---|---|---|---|---|---|
| I | 6:6:0 | 2.250/0.000 | 1.26 | 0.085 | 0.29 |
| II | 6:6:1 | 1.660/0.277 | 80.0 | 7.69 | 30.3 |
| III | 6:6:2 | 1.970/0.657 | 7.94 | 0.55 | 1.98 |
| IV | 6:6:3 | 1.760/0.720 | 3.70 | 0.18 | 0.72 |
| V | 6:6:4 | 2.100/1.400 | 4.33 | 0.18 | 0.84 |
| VI | 6:6:5 | 0.847/0.706 | 4.95 | 0.24 | 0.59 |
| VII | 6:6:6 | 0.901/0.901 | 4.73 | 0.32 | 0.50 |

TABLE 16

Symmetric energy storage device with electrode containing Nafion®, activated carbon, and ferrocene. Evaluated based on the weight of the whole assembly.

| | Weight of Whole Assembly, mg | Specific Capacitance, F/g | Specific Power, kW/kg | Specific Energy, Wh/kg |
|---|---|---|---|---|
| I | 24.5 | 0.12 | 0.0078 | 0.026 |
| II | 23.6 | 0.94 | 0.090 | 0.36 |
| III | 24.6 | 0.21 | 0.015 | 0.053 |
| IV | 24.4 | 0.11 | 0.0053 | 0.021 |
| V | 25.6 | 0.24 | 0.0098 | 0.046 |

TABLE 16-continued

Symmetric energy storage device with electrode containing Nafion ®, activated carbon, and ferrocene. Evaluated based on the weight of the whole assembly.

| | Weight of Whole Assembly, mg | Specific Capacitance, F/g | Specific Power, kW/kg | Specific Energy, Wh/kg |
|---|---|---|---|---|
| VI | 22.4 | 0.16 | 0.0074 | 0.018 |
| VII | 22.7 | 0.19 | 0.013 | 0.020 |

In order to enhance the performance of the mediator enhanced polymer electrolyte energy storage devices, three methods provide increased of the Nafion® and PEO polymer electrolyte. These were: 1. adding salts and plasticizers to the PEO polymer, 2. adding mesoporous oxides into the Nafion® and PEO polymers, and 3. hot pressing.

To add a mesoporous oxide, a $SiO_2$ solution may be prepared by diluting 10.4 grams of tetraethyl orthosilicate (TEOS) ($C_8H_{20}O_4Si$) in absolute ethanol (23 gram), deionized water (9 gram), and hydrochloric acid (0.5M, 9 ml) in a beaker. The solution is constantly stirred using a magnetic stirrer and monitored with a pH meter. Silica networks form from the tetraethoxysilane. The final concentration of the $SiO_2$ sol-gel was 6.75 mmol/g.

Similarly, a $TiO_2$ solution may be prepared by diluting titanium(IV) iopropoxide (TiOCH($CH_3$)$_2$)$_4$ 14.2 g) in absolute ethanol (23 g), deionized water (9 g), and hydrochloric acid (0.5N, 9 ml) and then stirred using a magnetic stirrer and monitored with a pH meter. The procedure for preparation of $TiO_2$ sol-gel is similar to that for preparing $SiO_2$ sol-gel.

Pure polyethylene oxide (PEO) powder with an average molecular weight of 400,000 may be dissolved in acetonitrile solution ($CH_3CN$) and stirred at for 8-10 hours at 60° C., as described above. A lithium salt is combined added to the PEO polymer by mixing the PEO powder with lithium aluminate powder ($LiAlO_2$) or lithium trifluoromethane-sulfonate (LiTFS) ($LiCF_3SO_3$) or lithium perchlorate powder (($LiClO_4$) in acetonitrile solution. Optionally, to enhance the ionic conductivity a plasticizer may be added.

Ethylene carbonate (EC) ($C_3H_4O_3$) or propylene carbonate (PC) ($C_4H_6O_3$) may be added to the acetonitrile solution together with PEO powder and a lithium salt. The mixtures are stirred for 8-10 hours and the mass ratio of the acetonitrile solution to the total mass of the solid components may be about 10:1. The Mesoporous $SiO_2$ or $TiO_2$ is also added to the mixture. An aliquot of the suspensions is then poured into a square Teflon® mold and dried.

A Nafion® 117 solution (5 wt % Nafion® in a mixture of lower aliphatic alcohol and water) may also be mixed with either $SiO_2$ or $TiO_2$ sol-gel. An aliquot of the suspensions may then be poured into a square Teflon® mold and dried. In order to evaluate the effect of mediator on the conductivity, $NaI/I_2$ is added.

A standard four contact test sample is used to evaluate the conductivity of prepared polymer electrolyte membranes. The four contacts include a working electrode, a working sensor, a reference electrode and a counter electrode. Platinum wires are used as working sense and reference electrodes while stainless sheets are used as working and counter electrodes. While a small alternating current is passed through the membrane, the working sense and reference electrodes detected the potential drop along the distance between the two Pt wires. The resistance between the two Pt wires may then be used to evaluate the conductivity, $\sigma$, according to the equation:

$$\sigma = 1/RS$$

wherein R is the resistance, 1 is the distance between the two platinum wires, and S is the cross section area of the membrane. The results are shown in Table 17.

Table 17 reports results of conductivity and density measurement results for PEO/LiAlO$_2$ electrolyte membranes. The pristine PEO membrane showed a conductivity of $6.11 \times 10^{-5}$ while the addition of LiAlO$_2$ increases the conductivity by a factor of 7.3. The conductivity is substantially increased by Li and $AlO_2^-$ ions. Addition of mesoporous $TiO_2$ to 3 wt % results in a 1.7 fold increase in conductivity. Addition of mesoporous $SiO_2$ does not substantially increase conductivity. Hot pressing at 110° C. significantly increases the ionic conductivity of the PEO electrolyte membrane by up to one order of magnitude. The effect of hot pressing is more pronounced if the duration of hot pressing is increased. The density of the membranes with or without hot pressing, varied in a range from 1.00 to 1.75 g/cm$^3$. There is no correlation between the conductivity and density.

Table 18 shows the conductivity and density measurements of PEO/LiTFS, i.e. lithium(trifluoromethylsulfonyl)-imide ($LiN(SO_2CF_3)_2$), electrolyte membranes. Hot pressing provides a greater increase in conductivity than the addition of plasticizers.

PEO/LiClO$_4$ electrolyte membranes may also be prepared. The membranes are soft and stretchable. When they were peeled off from the Teflon® mold, they immediately shrank. It was difficult to set up them into the test fixture. However, due to their gel-like properties, the electrolyte was used to prepare the electrodes for energy storage devices. Hot pressing the electrodes containing PEO/LiClO$_4$ electrolyte yielded reduction in the cell resistance and enhancement of the specific capacitance indicating that hot pressing also increased the conductivity of the PEO/LiClO$_4$ electrolyte.

TABLE 17

Conductivity and density data for PEO/LiAlO$_2$ electrolyte membranes.

| Duration of hot pressing at 110° C. and 5000 psi | PEO, gram | LiAlO$_2$, gram | TiO$_2$, gram | SiO$_2$, gram | Density g/cm$^3$ | $\sigma$, S/cm |
|---|---|---|---|---|---|---|
| 0 min | 1 | | | | 1.13 | $6.11 \times 10^{-5}$ |
| 0 min | 1 | 0.2 | | | 1.48 | $4.45 \times 10^{-4}$ |
| 5 min | | | | | — | $1.19 \times 10^{-3}$ |
| 15 min | | | | | — | $6.77 \times 10^{-4}$ |
| 35 min | | | | | — | $1.25 \times 10^{-3}$ |
| 0 min | 1 | 0.2 | 0.012 | | 1.28 | $2.60 \times 10^{-4}$ |
| 5 min | | | (1 wt %) | | 1.16 | $8.16 \times 10^{-4}$ |
| 15 min | | | | | 1.00 | $7.90 \times 10^{-4}$ |
| 35 min | | | | | 1.45 | $7.77 \times 10^{-4}$ |
| 0 min | 1 | 0.2 | 0.037 | | 1.13 | $7.41 \times 10^{-4}$ |
| 5 min | | | (3 wt %) | | 1.39 | $1.08 \times 10^{-3}$ |
| 15 min | | | | | 1.45 | $1.48 \times 10^{-3}$ |
| 35 min | | | | | 1.07 | $2.63 \times 10^{-3}$ |
| 0 min | 1 | 0.2 | 0.063 | | 1.20 | $3.02 \times 10^{-3}$ |
| 5 min | | | (5 wt %) | | 1.20 | $5.50 \times 10^{-4}$ |
| 15 min | | | | | 1.30 | $5.50 \times 10^{-4}$ |
| 35 min | | | | | — | $8.84 \times 10^{-4}$ |
| 0 min | 1 | 0.2 | 0.090 | | 1.35 | $4.03 \times 10^{-4}$ |
| 5 min | | | (7 wt %) | | — | $1.02 \times 10^{-3}$ |
| 15 min | | | | | — | $8.64 \times 10^{-4}$ |
| 35 min | | | | | — | $1.40 \times 10^{-3}$ |
| 0 min | 1 | 0.2 | 0.13 | | 1.38 | $7.24 \times 10^{-4}$ |
| 5 min | | | (10 wt %) | | 1.30 | $5.77 \times 10^{-4}$ |

TABLE 17-continued

Conductivity and density data for PEO/LiAlO$_2$ electrolyte membranes.

| Duration of hot pressing at 110° C. and 5000 psi | PEO, gram | LiAlO$_2$, gram | TiO$_2$, gram | SiO$_2$, gram | Density g/cm$^3$ | σ, S/cm |
|---|---|---|---|---|---|---|
| 15 min | | | | | 1.27 | 8.62 × 10$^{-4}$ |
| 35 min | | | | | 1.27 | 1.98 × 10$^{-3}$ |
| 0 min | 1 | 0.2 | | 0.012 (1 wt %) | 1.20 | 3.11 × 10$^{-4}$ |
| 5 min | | | | | 1.40 | 5.41 × 10$^{-4}$ |
| 15 min | | | | | 1.50 | 4.07 × 10$^{-4}$ |
| 35 min | | | | | 1.22 | 8.93 × 10$^{-4}$ |
| 0 min | | | | 0.037 (3 wt %) | 1.17 | 2.58 × 10$^{-4}$ |
| 5 min | | | | | 1.30 | 1.00 × 10$^{-3}$ |
| 15 min | | | | | 1.11 | 5.89 × 10$^{-4}$ |
| 35 min | | | | | 1.12 | 2.25 × 10$^{-3}$ |
| 0 min | | | | 0.063 (5 wt %) | 1.18 | 3.00 × 10$^{-4}$ |
| 5 min | | | | | 1.12 | 1.01 × 10$^{-3}$ |
| 15 min | | | | | 1.01 | 1.22 × 10$^{-3}$ |
| 35 min | | | | | 1.22 | 1.89 × 10$^{-3}$ |
| 0 min | | | | 0.090 (7 wt %) | 0.77 | 2.02 × 10$^{-4}$ |
| 5 min | | | | | 1.15 | 8.67 × 10$^{-4}$ |
| 15 min | | | | | 1.08 | 1.79 × 10$^{-3}$ |
| 35 min | | | | | 1.22 | 1.48 × 10$^{-3}$ |
| 0 min | | | | 0.13 (10 wt %) | 1.05 | 3.00 × 10$^{-4}$ |
| 5 min | | | | | 1.50 | 7.51 × 10$^{-4}$ |
| 15 min | | | | | 1.30 | 1.20 × 10$^{-3}$ |
| 35 min | | | | | 1.75 | 1.38 × 10$^{-3}$ |

TABLE 18

Conductivity and density data for PEO/LiTFS electrolyte membranes.

| Duration of hot pressing at 110° C. and 5000 psi | PEO, gram | LiTFS, gram | EC, gram | PC, gram | Density g/cm$^3$ | σ, S/cm |
|---|---|---|---|---|---|---|
| 0 min | 1 | | | | 1.13 | 6.11 × 10$^{-5}$ |
| 0 min | 1.2 | 1.2 | 0.6 | | — | 1.22 × 10$^{-4}$ |
| 5 min | | | | | — | 4.64 × 10$^{-4}$ |
| 15 min | | | | | 1.10 | 1.15 × 10$^{-3}$ |
| 35 min | | | | | — | 1.71 × 10$^{-3}$ |
| 0 min | 1.2 | 1.2 | 1.2 | | — | 2.82 × 10$^{-4}$ |
| 5 min | | | | | 0.90 | 1.07 × 10$^{-3}$ |
| 15 min | | | | | — | 4.39 × 10$^{-4}$ |
| 35 min | | | | | — | 1.32 × 10$^{-3}$ |
| 0 min | 1.2 | 1.2 | 0.6 | 0.6 | — | 2.29 × 10$^{-4}$ |
| 5 min | | | | | 1.00 | 5.32 × 10$^{-4}$ |
| 15 min | | | | | 1.20 | 5.24 × 10$^{-4}$ |
| 35 min | | | | | — | 7.61 × 10$^{-4}$ |

The water uptake of a membrane is determined by the following procedure. First, a piece of dry membrane is weighed. Second, the membrane is equilibrated in pure water for 2 minutes. Third, the membrane is weighed again. The total amount of water uptake in the membrane is calculated by subtracting the second weight from the first weight. The cast membrane from pure Nafion® solution disintegrates when it is immersed in water. This does not occur with reinforced Nafion® membranes. As shown in Table 23, as the silica sol-gel content increased from 1% to 15%, the water uptake decreases from 32% to 15%. The cast Nafion® membrane without SiO$_2$ disintegrates after immersing in water. Also, the addition of SiO$_2$ improves the stability of Nafion® membrane.

Addition of NaI/I$_2$ mediator increases the conductivity of PEO electrolyte. The results are shown in Table 19.

TABLE 19

Conductivity for PEO based electrolytes.
Conductivity of membranes with and without mediators, NaI/I$_2$

| Membrane | Conductivity (single measurement) | Average conductivity (Scm$^{-1}$) |
|---|---|---|
| Without I$_2$ and NaI | 6.61 × 10$^{-4}$ | 6.22 × 10$^{-4}$ |
| | 6.44 × 10$^{-4}$ | |
| | 5.60 × 10$^{-4}$ | |
| With I$_2$ and NaI | 2.33 × 10$^{-2}$ | 2.02 × 10$^{-2}$ |
| | 1.87 × 10$^{-2}$ | |
| | 1.86 × 10$^{-2}$ | |

The poly(ethylene oxide) based film may be saturated with LiCF$_3$SO$_3$ and ethylene carbonate (EC) to form a solid state electrolyte for use in mediator enhanced polymer electrolyte energy storage devices. This film was cut into three samples. In its pristine form, the ionic resistivity of such films is on the order of 1.2 k-ohm. The ionic resistivity of the pristine film decreases to about 10 ohm with hot pressing at 110° C. and 5000 psi for 20 minutes. Further decrease in ionic resistivity to about 1 ohm is achieved with hot pressing at 110° C. and 5000 psi for 60 minutes.

Figure 9:
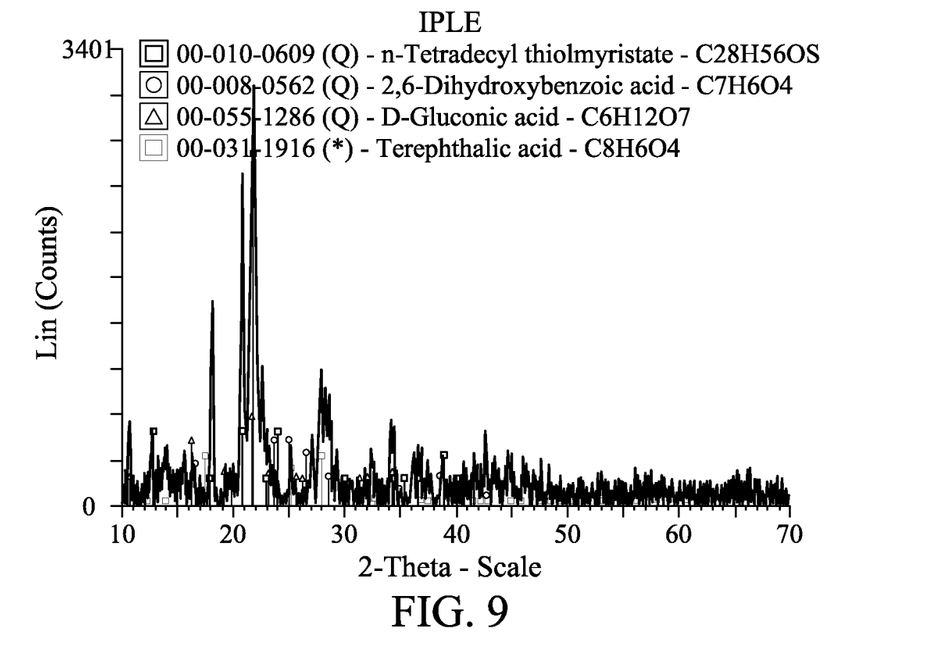
FIG. 9 is an X-ray diffraction spectrum for an electrode containing carbon powder, iodine, sodium iodide, polyethylene oxide, and $LiCF_3SO_3$.

FIG. 9 shows an X-ray diffraction (XRD) spectrum for an electrode with carbon powder, iodine (I$_2$) and sodium iodide (NaI), PEO, and LiCF$_3$SO$_3$. No crystalline iodine and sodium iodide may be identified from the XRD spectrum indicating that iodine and sodium iodide molecules may be either well dispersed in PEO or in an amorphous state. Either state is desired and in line with the expectation of present design.

Figure 10:
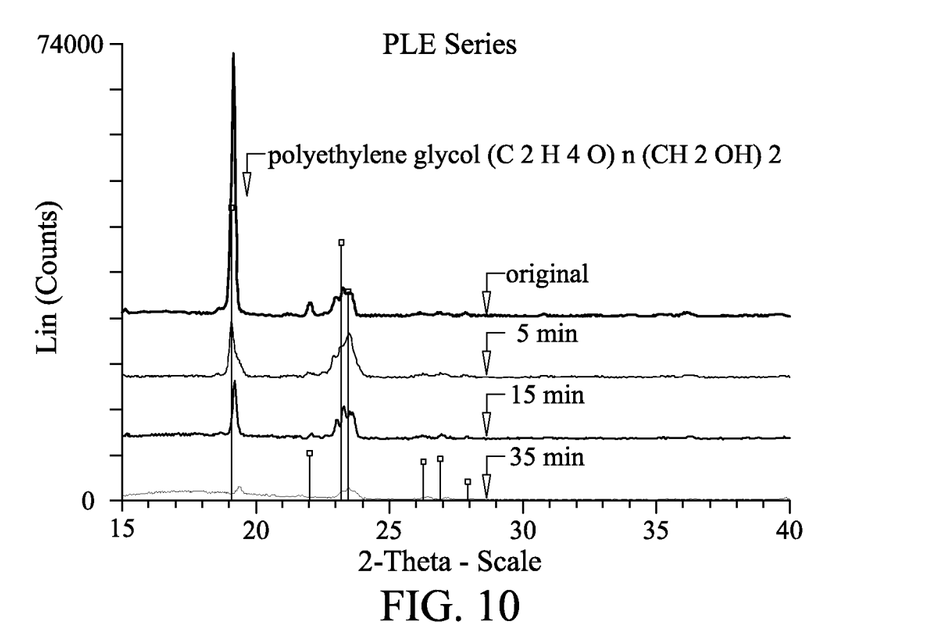
FIG. 10 is X-ray diffraction spectra for polyethylene oxide membranes that were not subjected to hot pressing and that were subjected to hot pressing at 110° C. and 4,500 psi for 5, 15 and 35 minutes.

FIG. 10 shows an XRD spectra indicating that hot pressing reduces the peak heights for crystalline PEO. Hot pressing may reduce crystallinity or increases amorphism.

The foregoing discussion discloses and describes embodiments of the invention by way of example. One skilled in the art will readily recognize from this discussion, that various changes, modifications and variations can be made therein without departing from the spirit and scope of the invention as defined in the following claims.

What is claimed is:

1. A solid state energy storage device comprising:
  a first electrode;
  a second electrode;
  a separator membrane between the first electrode and the second electrode;
  a first electrolyte in contact with the first electrode and the separator membrane, the first electrolyte comprising dissociated salt ions, a mediator and a substantially solid solvent, the mediator of the first electrolyte being comprised of a reduced species of a molecule and an oxidized species of the molecule in a ratio of ten reduced molecules to one oxidized molecule; and
  a second electrolyte in contact with the second electrode and the separator membrane, the second electrolyte comprising dissociated salt ions, a mediator and a substantially solid solvent, the mediator of the second electrolyte being comprised of a reduced species of a molecule and an oxidized species of the molecule in a ratio of one reduced molecule to ten oxidized molecules;
  wherein the separator membrane is non-conductive, permeable to the dissociated salt ions and impermeable to the mediator.

2. The solid state energy storage device of claim 1, wherein the first electrode and second electrode are comprised of at least one material selected from the group consisting of porous carbon monoliths, carbon powder, carbon fiber, carbon cloth, carbon film, carbon aerogels, carbon nanotubes, carbon foam, carbon nanofibers, graphite, porous aluminum oxide, and porous titanium oxide.

3. The solid state energy storage device of claim 1, wherein the separator membrane is comprised of at least one material selected from the group consisting of polyethylene, polyethylene oxide, polypropylene, polytetrafluoroethylene, solid cross-linked polysiloxane and a sulfonated tetrafluoroethylene based fluoropolymer-copolymer film.

4. The solid state energy storage device of claim 1, wherein the mediator is comprised of at least one molecule selected from the group consisting of ferrocene, ferricyanide, ferrocyanide, iodide and iodine.

5. The solid state energy storage device of claim 1, wherein the dissociated salt ions are dissociated ions of at least one salt selected from the group consisting of lithium hexfluorophosphate, lithium perchlorate, lithium-bis-oxalatoborate, lithium-tetrafluoroborate, lithium(trifluoromethylsulfonyl)-imide, and lithium-aluminum oxide.

6. The solid state energy storage device of claim 1, wherein the substantially solid electrolyte solvent is at least one material selected from the group consisting of polyethylene oxide, sulfonated tetrafluoroethylene based fluoropolymer-copolymer, ethylene carbonate, propylene carbonate, diethylene carbonate and dimethyl carbonate.

7. The solid state energy storage device of claim 1, wherein the first electrode and the second electrode both comprise activated carbon;
wherein the first electrolyte comprises a sulfonated tetrafluoroethylene based fluoropolymer-copolymer solvent and a mediator comprising a mixture of iodide and iodine; and
wherein the second electrolyte comprises a sulfonated tetrafluoroethylene based fluoropolymer-copolymer solvent and a mediator comprising a mixture of iodide and iodine.

8. The solid state energy storage device of claim 1, wherein the separator membrane is between 25 and 50 micrometers thick.

9. A solid state energy storage device comprising:
a first electrode;
a second electrode;
a separator membrane between the first electrode and the second electrode;
a first electrolyte in contact with the first electrode and the separator membrane, the first electrolyte comprising dissociated salt ions, a mediator and a substantially solid solvent; and
a second electrolyte in contact with the second electrode and the separator membrane, the second electrolyte comprising dissociated salt ions, a mediator and a substantially solid solvent;
wherein the first electrolyte and the second electrolyte both comprise a polyethylene oxide solvent, a lithium salt and a ferrocene mediator.

10. A solid state energy storage device comprising:
a first electrode;
a second electrode;
a separator membrane between the first electrode and the second electrode;
a first electrolyte in contact with the first electrode and the separator membrane, the first electrolyte comprising dissociated salt ions, a mediator and a substantially solid solvent; and
a second electrolyte in contact with the second electrode and the separator membrane, the second electrolyte comprising dissociated salt ions, a mediator and a substantially solid solvent; the first electrolyte and the second electrolyte both comprise a polyethylene oxide solvent, a lithium salt and a ferrocene mediator;
wherein the first electrode and the second electrode both comprise a mixture of carbon foam and carbon powder.

* * * * *